United States Patent [19]

Simpson

[11] Patent Number: 4,979,069
[45] Date of Patent: Dec. 18, 1990

[54] MOTOR FAULT DETECTOR WITH OPTICAL ISOLATION

[75] Inventor: Elmer Simpson, Plymouth, Mass.

[73] Assignee: Elmer Simpson & Edgar Powell, Fort Worth, Tex.

[21] Appl. No.: 25,095

[22] Filed: Jan. 8, 1987

Related U.S. Application Data

[63] This is a continuation of application Ser. No. 785,484, Oct. 8, 1985, abandoned.

[51] Int. Cl.$^5$ .............................................. H02H 3/10
[52] U.S. Cl. ...................................... 361/31; 361/173
[58] Field of Search ..................................... 361/23-31, 361/96, 173-178, 22; 318/434, 420, 453

[56] References Cited

U.S. PATENT DOCUMENTS

| | | | |
|---|---|---|---|
| 3,579,217 | 5/1971 | Casey et al. | 361/30 X |
| 3,612,882 | 10/1971 | Sheppard | 361/176 X |
| 3,688,157 | 8/1972 | Spears | 361/30 |
| 3,878,439 | 4/1975 | Crozier | 361/175 |
| 4,065,804 | 12/1977 | Rostad | 361/29 X |
| 4,251,846 | 2/1981 | Pearson et al. | 361/30 |
| 4,498,077 | 2/1985 | Richardson | 361/23 X |
| 4,602,484 | 7/1986 | Bendikson | 361/22 X |

Primary Examiner—William M. Shoop, Jr.
Assistant Examiner—A. Jonathan Wysocki
Attorney, Agent, or Firm—Malin, Haley, McHale, DiMaggio & Crosby

[57] ABSTRACT

A motor protection apparatus with a current monitor, the current monitor sensing the presence of current in at least one phase of an electric motor. An ammeter is responsive to the monitor, the ammeter indicating the level of current present in the motor phase. A variable resistor is interposed the monitor and the ammeter, allowing the ammeter to selectively indicate start current and run current present within the motor phase. An optical isolator is responsive to the ammeter for indicating readings of the ammeter at predetermined values. A relay is responsive to the optical isolator, for controlling the presence or absence of input voltage to the motor. The motor protection device senses fault conditions in both the start mode and run mode of the motor, and initiates appropriate responses thereto. The motor is thereby protected from permanent damage by the early detection of fault conditions. The device operates on electric motors having one or more phases, including three phase motors, as well as D.C. motors.

17 Claims, 2 Drawing Sheets

MOTOR FAULT DETECTOR WITH OPTICAL ISOLATION

BACKGROUND OF THE INVENTION

This continuation of application Ser. No. 785,484, Oct. 8, 1985, abandoned.

The subject matter of this invention relates to electric motor protection devices, and more particularly to an electric motor protection device which independently and simultaneously monitors the current present in all phases of a multi-phase motor. Those skilled in the electrical motor art have, since the first electrical motors, been concerned with protecting those motors from fault conditions which result in permanent damage. Motors typically require protection from faults occurring in two separate modes: the start mode and the run mode. Start and run currents of a motor in each phase differ greatly in value.

Damage to motor windings is the result of excess current therein. Current increases are caused from increased loads, bad contacts, phase problems, excessive bearing friction, bad capacitors, low lines, etc. Each of these conditions are hazardous to the motor's operation and detectable through current monitoring. Additionally, great temperature differentials can cause damage to a motor's windings. Short circuits, overloads, undervoltage, phase sequence voltage, ground faults, phase over currents, and great resistance temperatures are additional faults causing permanent motor damage.

Historically artisans have attempted to provide motor protection through devices such as phase loss detectors, expensive motor starters utilizing overload heater coils and contacts, bi-metallic contacts, in line fuses, coil-solder heater tubes, etc. Phase loss detectors, however, typically only monitor incoming lines because the motor is not running. Similarly, these prior art devices do not have a sufficient reaction time in order to detect a fault condition and prevent significant motor damage. Once the motor is running, these devices do not differentiate between starting current faults and running current faults, and therefore do not detect faults in the motor while in the run mode.

Finally, the prior art devices contain weaknesses which cause their own faults, and thereby prevent the detection of motor faults.

It is therefore highly desirable to provide an improved motor protection device which by simultaneously and individually monitoring the current in all phases of a multi-phase motor, detects and prevents faults which would otherwise cause catastrophic failure.

It is also highly desirable to provide an improved motor protection device which utilizes current monitoring at the motor windings which enables the detection of abnormalities in both the start mode and run mode of a motor.

It is also highly desirable to provide an improved motor protection device which individually, simultaneously, and constantly monitors the start and run current in all phases of a multi-phase motor.

It is also highly desirable to provide an improved motor protection device which can respond in milliseconds to a fault condition detected in any or all phases of a multi-phase motor.

It is also highly desirable to provide an improved motor protection device which is cost effective, yet operationally efficient.

It is also highly desirable to provide an improved motor protection device which can monitor any size motor regardless of voltage, cycle or phases, as well as having the ability to monitor AC or DC motors.

It is also highly desirable to provide an improved motor protection device which is highly accurate and allows for adjustable sensitivity, contains line and load monitoring, allows for transfer in the start and run monitoring modes, allows for variable or constant mode selectable monitoring, inherently includes fail safe operation, is capable of remote monitoring, and includes status indicators and alarm outputs.

It is also highly desirable to provide an improved motor protection device which utilizes current monitoring that inherently monitors and detects current, voltage, as well as phase problems.

Finally, it is highly desirable to provide an improved motor protection device which incorporates all of the above mentioned features.

SUMMARY OF THE INVENTION

It is therefore an object of the invention to provide an improved motor protection device which by simultaneously and individually monitoring the current in all phases of a multi-phase motor, detects and prevents faults which would otherwise cause catastrophic failure.

It is therefore an object of the invention to provide an improved motor protection device which utilizes current monitoring at the motor windings which enables the detection of abnormalities in both the start mode and run mode of a motor.

It is therefore an object of the invention to provide an improved motor protection device which individually, simultaneously, and constantly monitors the start and run current in all phases of a multi-phase motor.

It is therefore an object of the invention to provide an improved motor protection device which can respond in milliseconds to a fault condition detected in any or all phases of a multi-phase motor.

It is therefore an object of the invention to provide an improved motor protection device which is cost effective, yet operationally efficient.

It is therefore an object of the invention to provide an improved motor protection device which can monitor any size motor regardless of voltage, cycle or phases, as well as having the ability to monitor AC or DC motors.

It is therefore an object of the invention to provide an improved motor protection device which is highly accurate and allows for adjustable sensitivity, contains line and load monitoring, allows for transfer in the start and run monitoring modes, allows for variable or constant mode selectable monitoring, inherently includes fail safe operation, is capable of remote monitoring, and includes status indicators and alarm outputs.

It is therefore an object of the invention to provide an improved motor protection device which utilizes current monitoring that inherently monitors and detects current, voltage, as well as phase problems.

Finally, it is an object of the invention to provide an improved motor protection device which incorporates all of the above mentioned features.

Briefly what is provided is a motor protector device that monitors both the start and run current input to a motor in each phase. Extreme overcurrent or undercurrent results in motor shut down. The calculated overload current results in an alarm condition.

Slip-on current transformers, or hall effect sensors for DC motors, provide inputs to special ammeters. Each ammeter pointer has an opaque flag attached to it. These flags are positioned to block optical interrupters placed in the arc path of the meter movements. Each meter movement has three interrupters along its path: one at 0 current, one at a calculated overload current, and one at the final limit current. These three locations are referred to as "banks" of the analog meter.

The device is adjusted utilizing internal potentiometers to respond to very slight increases or decreases in current and respond accordingly. Two operating modes are available, one for variable loads and the other for constant loads. The variable load setting allows for a broad range of operating run current but prevents operation in extremely high or zero run or start current conditions. Constant mode monitoring mode permits operation only for a very narrow range of run current, i.e., a ±2 to 10% deviation would cause motor shutdown. This mode is very useful in fixed pressure pump operations such that either an increase in pressure or loss of prime would shut down the system saving both pump and motor.

Onboard status L.E.D.'s provide indications of self diagnosis, transfer modes and provide alarm status indications. Once the alarm or calculated overload zone is reached on any phase, as so indicated on the analog meters, the alarm relay is latched and its normally open contacts close providing audible and/or visual indications to a motor operator of abnormal fault conditions.

The device monitors any size motor regardless of voltage, cycle or phases by simply using the appropriately sized current transformers. In relation to a DC motor, the device utilizes hall effect sensors in place of the transformers, and the remaining circuitry performs in a similar manner.

The device inherently provides for fail safe operation in that should a component of the motor protection device fail, such as a capacitor, transistor, or electromagnetic relay, the device itself will also cause motor shutdown or an alarm condition.

BRIEF DESCRIPTION OF THE DRAWINGS

The above mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE SPECIFIC EMBODIMENT

Figure 1:
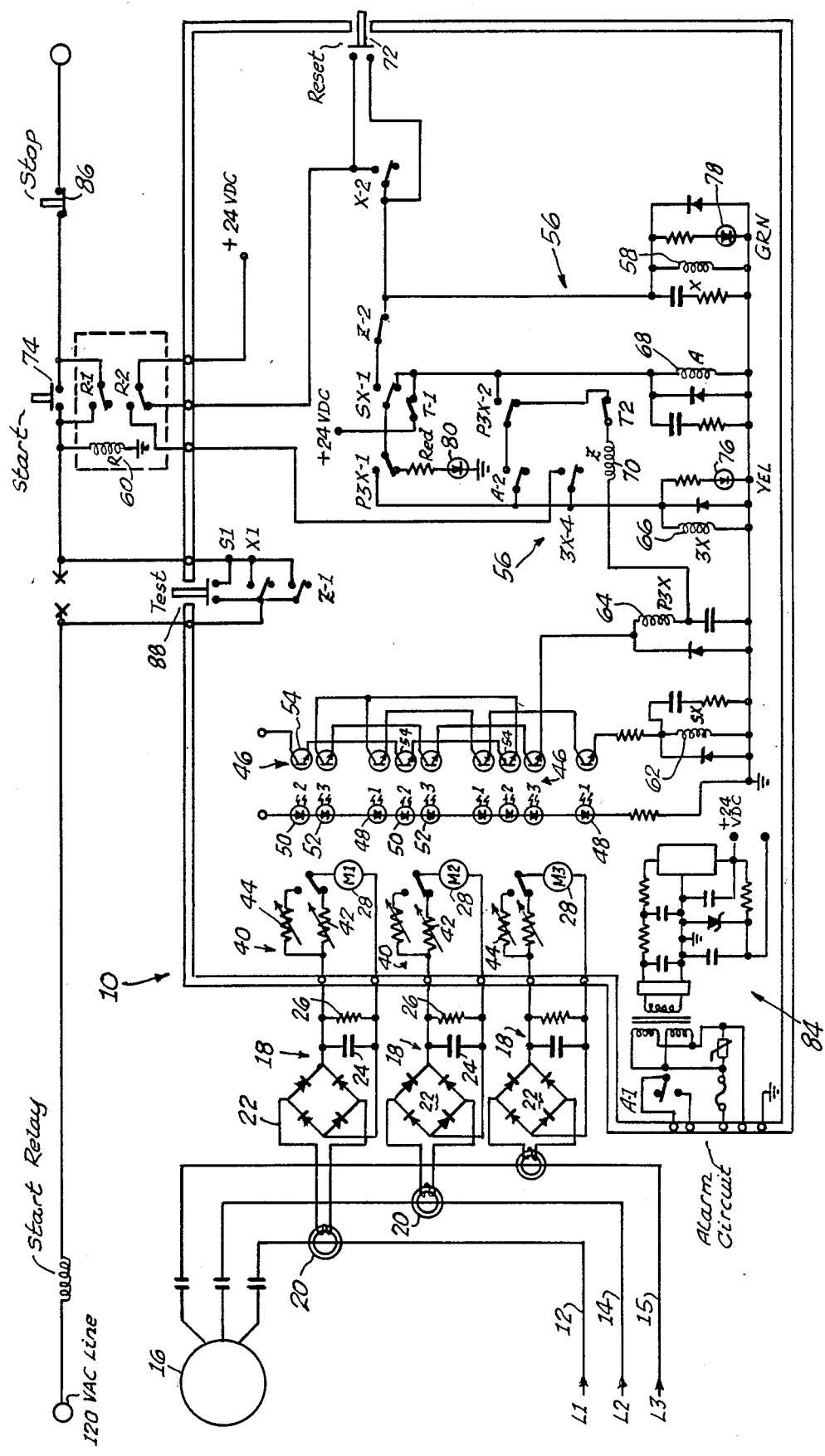
FIG. 1 is an electrical schematic diagram illustrating the circuitry of the invention.

Referring now to FIG. 1, the improved motor protection device 10 is illustrated. The device monitors the three phases 12, 14 and 15 of electric motor 16. Current monitoring means 18 individually and simultaneously monitors the current in all phases of motor 16. In a specific embodiment, current monitoring means 18 is comprised of current transformer 20, and diode-bridge 22 acting in conjunction with capacitor 24 and resistor 26.

Ammeter means 28 is responsive to the current monitoring means 18, and each individual ammeter means 28 indicates the level or amount of current present in each associated motor phase 12, 14 and 15.

Figure 2:
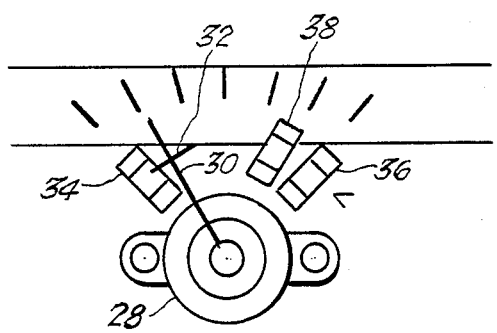
FIGS. 2 and 3 are diagrammatical views illustrating the features of the analog ammeter.

Referring now to FIG. 2, the analog ammeter is illustrated in detail. Ammeter 28 is shown having a mechanical pointer 30 which has an opaque flag 32 positioned thereupon. Also shown are the three banks: bank one, element 34, bank two, element 36, and bank three, element 38. These three banks correspond to the preselected current values of the motor protection device. Bank one corresponds to the zero current value. Bank two corresponds to the final current value and bank three corresponds to the overload current value. It is noted that the overload current value is interposed the zero current value and the final current value as indicated in FIG. 2.

Figure 3:
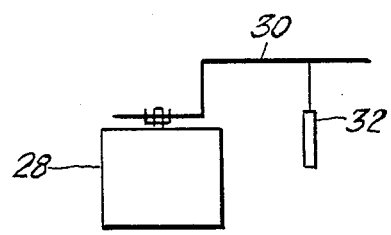

Viewing FIGS. 1-3 together, it is understood that each analog ammeter 28 illustrated in FIG. 1 corresponds to the meter having the characteristics illustrated in FIG. 2. That is, each individual meter 28 contains three discrete banks 34, 36, and 38. These calculated current zones are utilized in the operation of the motor protection apparatus in both the start current mode and run current mode, as will be described in detail hereinafter.

Variable resistor means 40 interpose ammeter means 28 and current monitoring means 18 in the discrete channels or parallel circuitry for each of the individual phases 12, 14 and 15 of motor 16. Variable resistor means 40 contains start current resistor 42 and run current resistor 44. It is readily recognized by those skilled in the art that there is required a high resistance in the circuit for start up current monitoring as the individual phases of the motor are subjected to high upsurge currents. Once the motor reaches the run or constant mode condition, the current in the individual phases 12, 14 and 15 is a much lower value. Thus, once the motor has reached the run mode, the motor protection apparatus can monitor the lower run currents by allowing the ammeter means 28 to monitor the phase currents through run resistors 44. Through the variable resistor means, the motor protection device allows the ammeter means 28 to selectively indicate start current and/or run current that is present in the individual phases of multiphase motor 16. As an artisan will recognize, one can select any current ratio to be present at the meter in regard to the phase/meter ratio. Thus, if there is 100 amps present for the start current in a particular motor phase, one can select the ratio such that 30 microamps is present at analog meter 28. This is accomplished through proper selection of variable resistor means 40.

Optical isolator means 46 are responsive to ammeter means, for indicating readings of said ammeter means at predetermined values. Specifically, these predetermined values are the current level values corresponding to bank one, element 34, bank three, element 38, and bank two, element 36, of FIG. 2. Bank one is positioned on analog meter 28 to indicate a zero current value, bank three is positioned on analog meter 28 to indicate the overload current value, and bank two is positioned on analog meter to respond to the final current value. Viewing FIG. 1, each optical isolator means 46 can be seen as having three L.E.D.'s 48, 50 and 52 which correspond to the three banks of ammeter 28. That is, L.E.D. one corresponds to bank one, L.E.D. two corresponds to bank two, and L.E.D. three corresponds to bank three.

In a specific embodiment each optical isolator means 48 is comprised of light-emitting diodes 48, 50 and 52, as well as corresponding phototransistors 54. It will be seen in FIG. 1 that each particular L.E.D. is optically coupled, and electrically isolated, from a corresponding L.E.D. As an artisan will recognize, the optical detector will generate a signal via the emitter of the phototransistor upon the presence of light generated by the corresponding L.E.D.

The L.E.D.'s are electrically associated with the banks of ammeter means 28 such that when the opaque flag 32 of pointer 30 is placed within any of the banks one, two, or three, this will prevent light from the L.E.D. from being detected by the corresponding phototransistor, thereby de-energizing the phototransistor and preventing an emitter generated signal. In this fashion, the pointer of the analog meter 28 is utilized to enable and disable the phototransistors 54 upon the reading of the values of the multiphase motor. The improved motor protection device 10 utilizes these phototransistor signals, or the absence thereof, to control the flow of power input to the motor, as well as to control the initiation of alarm and status circuitry, as will be further described in detail hereinafter.

In a specific embodiment the individual L.E.D.'s corresponding to the three bank groups of all three analog meters 28 are electrically connected in series. Each L.E.D. has an associated, optically coupled phototransistor. The various phototransistors are electrically connected in a cascading, latching array such that one disabled phototransistor will disable the other corresponding latched phototransistors within the array and will ultimately be detected by relay means 56. This feature of the invention will also be described below.

Relay means 56 is illustrated as being comprised of initialization relay 58 (X), run relay 60 (R), motor sensing relay 62 (SX), pilot relay 64 (P3X), and ammeter control relay 66 (3X). The circuit also includes alarm relay 68 (A) and constant run relay 70 (Z).

Reset switch 72 is utilized to initiate the device.

It will be noted that each of the individual relays has associated relay contacts which are illustrated in the schematic at the appropriate circuit nodes. For example, X relay 58 controls relay contacts X-1 and X-2. P3X relay 64 controls relay contacts P3X-1 and P3X-2. Other relays control their corresponding relay contacts as indicated in the operation of the circuitry.

In general the circuitry operates as follows: upon initiation of reset switch 72, the X relay is energized with the +24 volts DC through the normally closed relay contact R-2 of relay 60. Relay 58 becomes energized and is self held through relay contact X-2. Relay contact X-1 closes which allows the motor to be started upon activation of start switch 74. Once the start switch 74 is activated, the relay contact R-1 closes which self holds the motor starting circuit and relay contact R-2 closes which provides +24 volts to normally open relay contact 3X-4. Once the motor is started there is current present in the individual phases of the multi-phase motor 16. The current monitoring means 18 and ammeter means 28 will sense this start current, and the opaque flag on the ammeter 28 will move out of bank one and thereby activate the optical isolator means 46 which will energize motor sensing relay 62. Relay 62 activates associated relay contacts SX-1 and SX-2 which will self hold initialization relay 58 and will allow the energization of pilot relay 64. Pilot relay 64 will activate contacts P3X-1 and P3X-2 which will enable ammeter control relay 66 to energize thereby closing contacts 3X-1, 3X-2, and 3X-3 which switches the variable resistor means 40 and provides a run resistor value to be input to ammeter means 28. The system is now in the run mode and operating correctly in the absence of any faults.

This general description assumes that the invention is in the constant monitoring mode and that therefore toggle switches T1 and T2 are closed. In the variable mode, as described below, these toggles switches will be opened.

Ammeter control relay 66 has yellow light-emitting diode 76 electrically connected in parallel, therefore when this relay is energized this yellow L.E.D. will also be energized. Similarly, initialization relay 58 is associated with green L.E.D. 78. Red L.E.D. 80 is placed in the circuitry to indicate the ready mode, as well as particular fault statuses of the invention.

Power supply circuit 84 is illustrated as providing a +24 volts DC to the circuitry 10 through transformer T1 upon application of 120 volts AC. Stop switch 86, will terminate the operation of the motor, and test switch 88 allows one to attempt to initiate the motor if a fault within the monitoring circuitry is suspected.

The above general description of the relay means 56 is intended to provide the basic hierarchy of the relay system. The specific details of the relay operation, the various fault detection circuitry and status indications, as well as the entire system synchronization will now be described in detail with reference to the sequence of operations of the invention. This sequence of operation will be presented for both the constant mode operation and the variable load monitoring mode of the invention.

SEQUENCE OF OPERATIONS CONSTANT LOAD MONITOR SELECTED

Prior to constant modes operation, the following adjustments are made:

A. Start potentiometers adjusted such that each ammeter allows flags to move out of Bank 1 then into Bank 3 briefly then settle in between them.

B. Run potentiometers should be adjusted with constant load and flags are centered about Bank 3.

1. Apply 120 VAC power to unit +24 VDC from power supply turns on the red LED (calculated overload indicator) thru contacts P3X-1. The A relay is energized thru contact T1 continuously.

2. Reset unit for operation by pushing reset button This energizes the X relay and lights the green LED (ready indicator). NOTE: The X relay has a 6 second self hold timer such that if the SX relay does not energize before X time out a shut down due to faulty start (open leg) results. Contact X-1 closes to complete run signal line. Contact X-2 closes to self hold X relay.

3. If green LED (ready) indicator is on proceed to start motor by pushing start button. This energizes run relay. The run relay R-1 contact self holds run relay. R-2 contact provides +24 VDC to 3X-4 N.O. contact and removes +24 VDC from X coil placing X relay into self hold timing mode (approx 6 sec.).

4. The motor now starts and the flag(s) move out of Bank 1. Briefly, the flags are between Banks 1 and 3 as the start current increases. However, due to the SX relay having a delay to energize as well as a self holding timer, it should not energize until flags reach Bank 3 but not into Bank 2. SX relay can only energize when Banks 1 and 2 are uncovered and its delay to pickup has elapsed. This delay is to allow flag(s) movement into and out of Bank 3.

5. Upon the SX relay energizing, the SX-1 contact provides +24 VCD to the X relay to override the X timeout thru Z2. Contact SX-2 closes to provide ground to relay P3X when Bank 3 uncovers. Relay P3X acts to terminate the start monitoring mode.

6. A normal start results when the flag(s) jump from Bank 1 just into Bank 3 then fall in between them. After flags reach Bank 3 then fall below it the P3X relay energize as described. Contact P3X-1 provides +24 VDC to relay 3X and removes +24 VDC from the red LED. Contact P3X-2 closes to prevent Z relay from energizing.

7. When relay 3X energizes the unit is transferred to the run monitoring mode and so indicates this with the yellow LED. The 3X relay contacts 3X-1, 2, 3 close to run probe pots for run current monitoring. Contact 3X-4 places 3X into self hold via contact R-2. Upon transfer to run mode flag(s) center in Bank 3 de-energizing P3X. Contact P3X-1 opens to illuminate red LED. Contact P3X-2 energizes Z relay. Contact Z-1 catches run signal line and contact Z-2 de-energizes X relay turning off green LED.

8. Abnormal starts result in the following:
   8.1 No meter movement out of Bank 1 prevents the SX relay energizing. The X relay then never regains the +24 VDC to it's coil, times out and de-energizes. Contact X-1 opens the run line and the motor stops. Contact X-2 opens and prevents X self hold. Only red LED is on.
   8.2 Slight meter movement out of Bank 1 but not enough to reach Bank 3. As before, the SX relay energizes after its delay with SX-1 providing +24 to the X relay overriding the X timeout. SX-2 closes providing +24 VDC to relay P3X transferring unit to run monitor mode. This is observable on meters. Inspect contractor contacts.
   8.3 If excessive start current kept the flag(s) in Bank 3 continuously on this prevents P3X relay from energizing. Contact P3X-1 keeps red LED on and relay 3X de-energized. Contact P3X-2 remains open allowing a relay self timer to elapse de-energizing A setting off alarm circuit. The alarm, green and red LED's are on and the yellow LED is off.
   8.4 If at any time during the starting of the motor the flags should reach Bank 2, the final limit value, the unit will stop the motor. The SX-1 removes +24 VDC from the X relay, which after 6 seconds de-energizes. Contact X-1 interrupts run signal to run relay, opening motor power lines. Contact X-2 opens preventing X relay self hold Contact SX-2 de-energizes relay P3X preventing run mode.

Following a normal start:
9. Abnormal run results in the following:
   9.1 Insufficient current in a phase would allow flag(s) to fall to Bank 1. Any time this occurs the motor stops. The flag(s) would remove +24 VDC from SX relay which would de-energize X relay and break run signal. Red LED is on. Green and yellow LED and alarm off.
   9.2 If the constant load were to change moving the flag in between Bank 1 and 3 relay P3X would energize. Contact P3X-1 turns off red LED and contact P3X-2 de-energizes Z relay thru T2. Z-1 breaks run signal line and motor stops.
   9.3 Excessive current would move flag(s) beyond Bank 3 into Bank 2, the final limit. Again motor would stop per steps in 9.1.

10. Normal stop is accomplished by breaking run signal line (i.e. stop button). Run relay de-energizes itself through R-1, contact R-2 removes +24 VDC from relay 3X through 3X-4 and contacts 3X-1, 2, 3 return to start state with yellow LED off. Contact R-2 removes +24 VDC from 3X and Z via 3X-4. Relay X is supplied +24 VDC through SX-1 and Z-2 until it self latches via X-2. Flags fall into bank 1 de-energizing SX which de-energizes P3X.

SEQUENCE OF OPERATIONS VARIABLE LOAD MONITOR SELECTED

Prior to variable load operations the following adjustments are made:

A. Start potentiometers adjusted such that each phase ammeter allows flags to move out of Bank 1 then into Bank 3 briefly then settle in between them.

B. Run potentiometers should be adjusted with a full load where flags are nearly into Bank 3.

1. Apply 120 VAC power to unit +24 VDC from power supply turns on the red LED (calculated overload indicator) via contacts P3X-1. The A relay is energized via contacts SX-1. The relay contact A-1 opens alarm circuit, A-2 closes.

2. Reset unit for operation by pushing reset button. This energizes the X relay and lights the green LED (ready indicator). NOTE: The X relay has a 6 second self hold timer such that if the SX relay does not energize before X time out a shut down due to faulty start (open leg) results. Contact X-1 closes to complete run signal line. Contact X-2 closes to self hold X relay.

3. If green LED (ready) indicator is on proceed to start motor by pushing start button. This energizes run relay. The run relay R-1 contact self holds run relay. R-2 contact provides +24 VDC to 3X-4 N.O. contact and removes +24 VDC from X coil placing X relay into self hold timing mode (approx. 6 sec.).

4. The motor now starts and the flag(s) move out of Bank 1. Briefly, the flags are between Banks 1 and 3 as the start current increases. However, due to the SX relay having a delay to energize as well as a self holding timer, it should not energize until flags reach Bank 3 but not into Bank 2. SX relay can only energize when Banks 1 and 2 are uncovered and its delay to pickup has elapsed. This delay is to allow flag(s) movement into and out of Bank 3.

5. Upon the SX relay energizing, the SX-1 contact provides +24 VDC to the X relay to override the X timeout via Z-2 and removes +24 VDC from the A relay. This places the A relay into its 4 second self timer. Contact SX-2 closes to provide +24 VDC to relay P3X when Bank 3 uncovers. Relay P3X acts to terminate the start monitoring mode.

6. A normal start results when the flag(s) jump from Bank 1 just into Bank 3 then fall in between them. After flags reach Bank 3 then fall below it the P3X relay energize as described. Contact P3X-1 provides +24 VDC to relay 3X and removes +24 VDC from the red LED. Contact P3X-2 closes to provide via A2 the A relay self hold preventing timeout and the alarm condition. This terminates the start monitoring mode.

7. When relay 3X energizes the unit is transferred to the run monitoring mode and so indicates this with the yellow LED illumination. The 3X relay contacts 3X-1, 2, 3 close to run probe adjustment pots for lower current monitoring in run mode. Contact 3X-4 places 3X relay into self hold via contact R2. Unit is now set for run monitor following successful start.

8. Abnormal starts result in the following:
   8.1 No meter movement out of Bank 1 prevents the SX relay energizing. The X relay then never regains the +24 VDC to it's coil, times out and de-energizes. Contact X-1 opens the run line and the motor stops. Contact X-2 opens and prevents X self hold. Only red LED is on.

8.2 Slight meter movement out of Bank 1 but not enough to reach Bank 3. As before, the SX relay energizes after its delay with SX-1 providing +24 VDC to the X relay overriding the X timeout. SX-2 closes providing +24 VDC to relay P3X transferring unit to run monitor mode. This is observable on meters. Inspect contractor contacts.

8.3 Excess time/current keeping flags in Bank 3 too long then dropping out of Bank 3. The SX relay will energize and place the A relay into its self holding time mode. Should the flags remain in Bank 3 long enough for the A relay time out the alarm condition would result, sounding alarms and indicating circuits via A-1. This condition would remain until the unit is reset, but the unit will switch to run monitoring when the flags fall out of Bank 3. Alarm, green and yellow LED's are on but red LED is off.

8.4 If excessive start current kept the flag(s) in Bank 3 continuously this prevents P3X relay from energizing. Contact P3X-1 keeps red LED on and relay 3X de-energized. Contact P3X-2 remains open allowing a relay self timer to elapse de-energizing A setting off alarm circuit. The alarm, green and red LED's are on and the yellow LED is off.

8.5 If at any time during the starting of the motor the flags should reach Bank 2, the final limit current value, the unit will stop the motor. The SX-1 removes +24 VDC from the X relay, which after 6 seconds de-energizes. Contact X-1 interrupts run signal to run relay, opening motor power lines. Contact X-2 opens preventing X relay self hold. Contact SX-2 de-energizes relay P3X preventing run mode.

Following a normal start:

9. Abormal run results in the following:

9.1 Insufficient current in a phase would allow flag(s) to fall to Bank 1. Any time this occurs the motor stops. The flag(s) would remove +24 VDC from SX relay which would de-energize X relay and break run signal. Red LED is on. Green and yellow LED and alarm off.

9.2 The alarm will light and sound whenever flag(s) reach Bank 3, calculated overload. This condition prompts motor inspection as continued operation will result in motor damage. Red LED off, yellow and green LED on.

9.3 Excessive current would move flag(s) beyond Bank 3 into Bank 2, the final limit. Again motor would stop per steps in 9.1.

10. Normal stop is accomplished by breaking run signal line (i.e. stop button). Run relay de-energizes itself through R-1, contact R-2 removes +24 VDC from relay 3X through 3X-4 and contacts 3X-1, 2, 3 return to start state with yellow LED off. Contact R-2 removes +24 VDC from 3X and Z via 3X-4. Relay X is supplied +24 VDC through SX-1 and Z-2 until it self latches via X-2. Flags fall into bank 1 de-energizing SX which de-energizes P3X.

It will thus be seen that the objects set forth above, and those made apparent by the preceeding description, are efficiently attained and hence certain changes may be made in the above construction and electrical circuitry without departing from the scope of the invention. It is intended that all matters contained in the foregoing description and shown in the accompanying drawings shall be interpreted as illustrative and not in a limiting sense.

A person of ordinary skill in the art will envision alterations, modifications, and substitutions of equivalent devices as appropriate, and all are deemed to be within the inventive subject matter.

While there have been described above the principles of this invention in connection with the specific apparatus, it is to be clearly understood this description is made only by way of example and not as a limitation to the scope of the invention.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. An improved motor protection apparatus, comprising:

current monitoring means, said current monitoring means for sensing the presence of current in one phase of said motor;

ammeter means, responsive to said monitoring means, for indicating the level of current present in said phase, said ammeter means including indicator means that move in response to varying levels of current present in said phase, said indicator means being opaque;

variable resistor means interposed said monitoring means and said ammeter means, allowing said ammeter means to selectively indicate start current and run current in said phase;

optical isolator means, responsive to said ammeter means, for indicating readings of said ammeter means at predetermined values comprising one or more pairs of a light-emitting diode optically coupled to a phototransistor, each pair having a space between said light-emitting diode and said phototransistor adapted to allow at least one of said indicator means to move through said space in response to varying levels of current present in said phase, said indicator means blocking the light emitted from said light-emitting diode from reaching said phototransistor when said indicator means is between said light-emitting diode and said phototransistor, thereby de-energizing said pair of said optical isolator means having said indicator means between said light-emitting diode and said phototransistor; and relay means, responsive to said optical isolator means, for controlling the presence or absence of input voltage to said motor;

said motor protection apparatus sensing fault conditions in both the start mode and run mode of said motor and initiating appropriate responses thereto, whereby said motor is protected from permanent damage by the early detection of said faults.

2. The apparatus of claim 1 further comprising:
   visual indication means for indicating the energization of said relay means and differentiating between discrete statuses thereof.

3. The apparatus of claim 1 further comprising:
   reset means, for initializing said apparatus prior to starting said motor; and alarm means, for indicating the presence of select fault conditions and initiating appropriate responses.

4. The apparatus of claim 1 further comprising a plurality of said current monitoring means, said plurality corresponding in number to the number of phases of said motor, each said monitoring means monitoring a particular phase of said motor;
  a plurality of ammeter means, each of said ammeter means individually associated with a particular said monitoring means;
  a plurality of optical isolator means, each said optical isolator means individually associated with a particular ammeter means;
  said relay means being responsive to said plurality of optical isolator means;
  whereby said apparatus is a multi-phase motor protection device, individually monitoring the discrete phases of said motor.

5. The apparatus of claim 1 wherein said current monitoring means comprises a transformer electrically connected to a diode-bridge circuit.

6. The apparatus of claim 1 wherein:
  each of said indicator means comprises a pointer with an opaque flag positioned thereupon; each of said ammeter means having preselected banks corresponding to particular current values;
  each of said pairs of said optical isolator means individually electrically associated with a particular said ammeter bank; and,
  said relay means being electrically connected to said phototransistors and energization of select said pair of said optical isolator means thereby energizes a portion of said relay means.

7. The apparatus of claim 6 wherein said light-emitting diodes are electrically in series and said phototransistors are electrically cascaded in a latching manner.

8. The apparatus of claim 4 wherein each of said plurality of current monitoring means comprises a transformer electrically connected to a diode-bridge circuit.

9. The apparatus of claim 8 wherein each of said plurality of ammeter means includes an indicator means having a pointer with an opaque flag positioned thereupon, each of said ammeter means having preselected banks corresponding to particular current values;
  each of said pairs of said optical isolator means individually electrically associated with a particular said ammeter bank; and,
  said relay means being electrically connected to said phototransistors and energization of select said optical isolator means thereby energizes a portion of said relay means.

10. The apparatus of claim 9 wherein said light-emitting diodes of said plurality of said optical isolator means are electrically in series and said phototransistors of said plurality of said optical isolator means are electrically cascaded in a latching manner.

11. The apparatus of claim 1 wherein said relay means comprises a plurality of discrete electromechanical relays electrically connected in a latching array.

12. The apparatus of claim 11 wherein said plurality of electromechanical relays includes an initialization relay, a run relay, a motor sensing relay, a pilot relay, and an ammeter control relay, said initialization relay electrically connected to a reset circuit, said run relay electrically connected to the input voltage circuit of said motor;
  said motor sensing relay electrically connected to said optical isolator means, said motor sensing relay latching said initialization relay, said pilot relay being electrically connected to said optical isolator means, said pilot relay latching said ammeter control relay, said ammeter control relay switching the variable resistor means input to said ammeter for selectively indicating start current and run current.

13. The apparatus of claim 12 said wherein each of said electromechanical relays has a light-emitting diode electrically associated therewith to indicate the energization of said relay and thereby indicate a particular status of said motor protection apparatus.

14. The apparatus of claim 12 further comprising an alarm relay and a constant run relay, said alarm relay indicating the presence of a fault condition and initiating alarm circuitry, said constant run relay latching and removing said initialization relay upon the presence of a preselected mode.

15. An improved motor protection apparatus for the detection and monitoring of fault conditions in either the start mode or run mode of an electric motor, comprising:
  a current monitoring transformer which senses the presence of electrical current in one phase of said motor, said transformer electrically connected to a diode-bridge circuit;
  an ammeter, said ammeter being responsive to said current monitoring transformer, said ammeter indicating the level of current present in said phase, said ammeter having a pointer with an opaque flag positioned thereupon, said ammeter having preselected banks corresponding to particular said current values, variable resistor means interposed said current monitoring transformer and said ammeter, said variable resistor means allowing said ammeter to selectively indicate start current and run current in said phase, a plurality of optical detectors, said optical detectors being responsive to said ammeter, said optical detectors indicating readings of said ammeter at predetermined values, said plurality of optical detectors each being a light-emitting diode coupled to a phototransistor, each said optical detector individually electrically associated with a particular said ammeter bank, said light-emitting diodes being de-energized upon said opaque flag being positioned within said preselected banks, said light-emitting diodes being electrically connected in series and said phototransistors being electrically cascaded in a latching manner;
  a plurality of discrete electromechanical relays, said plurality of relays being responsive to said plurality of said optical detectors, for controlling the presence or absence of input voltage to said motor, said plurality of discrete electromechanical relays being electrically connected in a latching array including an initialization relay, a run relay, a motor sensing relay, a pilot relay, and an ammeter control relay, said initialization relay electrically connected to a reset circuit, said run relay electrically connected to the input voltage of said motor, said motor sensing relay electrically connected to said optical isolator means, said motor sensing relay latching said initialization relay, said pilot relay being electrically connected to said plurality of optical detectors, said pilot relay latching said ammeter control relay, said ammeter control relay switching the variable resistor means input to said ammeter for selectively indicating start current and run current;

said motor protection apparatus immediately sensing fault conditions in both the start mode and run mode of said motor, and rapidly initiating appropriate responses thereto, whereby said motor is protected from permanent damage by the early detection of said fault conditions.

16. The apparatus of claim 15 further comprising a motor protection apparatus for independently and simultaneously monitoring discrete phases of a multi-phase motor, comprising:

a plurality of said current monitoring transformers, said plurality of transformers corresponding in number to the number of phases of said multi-phased motor, each said transformer monitoring a articular phase of said motor;

a plurality of ammeters, each said ammeter individually associated and electrically connected to a particular said current monitoring transformer; and discrete groups of said plurality of optical detectors, each said discrete group individually associated with, and electrically connected to, a particular ammeter;

said plurality of relays being responsive to said discrete groups of said plurality of optical detectors;

whereby said apparatus is a multi-phased motor protection device, individually and simultaneously monitoring the discrete phases of said motor, sensing fault conditions in both the start modes and run modes of said motor, enabling early maintenance and preventing permanent damage to said motor.

17. An improved motor protection apparatus for DC motors, comprising:

current monitoring means, said current monitoring means for sensing the presence of current in at least one output of said motor;

ammeter means, responsive to said monitoring means, for indicating the level of current present in said output, said ammeter means including indicator means that move in response to varying levels of current present in said output of said motor, said indicator means being opaque;

variable resistor means interposed said monitoring means and said ammeter means, allowing said ammeter means to selectively indicate start current and run current in said output;

optical isolator means, comprising one or more pairs of a light-emitting diode optically coupled to a phototransistor, each pair having a space between said light-emitting diode and said phototransistor adapted to allow at least one of said indicator means to move through said space in response to varying levels of current present in said output of said motor, said indicator means blocking the light emitted from said light-emitting diode from reaching said phototransistor when said indicator means is between said light-emitting diode and said phototransistor, thereby de-energizing said pair of said optical isolator means having said indicator means between said light-emitting diode and said phototransistor; and relay means, responsive to said optical isolator means, for controlling the presence or absence of input voltage to said motor;

said motor protection apparatus sensing fault conditions in both the start mode and run mode of said motor and initiating appropriate responses thereto, whereby said motor is protected from permanent damage by the early detection of said faults.

* * * * *